US007873555B1

United States Patent
Kraemer

(10) Patent No.: US 7,873,555 B1
(45) Date of Patent: Jan. 18, 2011

(54) SYSTEM AND METHOD FOR AUTOMATICALLY REBALANCING PORTFOLIOS BY SINGLE RESPONSE

(75) Inventor: James Richard Kraemer, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 2624 days.

(21) Appl. No.: 09/685,398

(22) Filed: Oct. 10, 2000

(51) Int. Cl.
G06Q 40/00 (2006.01)

(52) U.S. Cl. .................... 705/36 R; 705/35; 705/37

(58) Field of Classification Search ............ 705/35, 705/37, 36 R
See application file for complete search history.

(56) References Cited

U.S. PATENT DOCUMENTS

| 5,806,049 | A | 9/1998 | Petruzzi | 705/36 |
|---|---|---|---|---|
| 5,873,071 | A | 2/1999 | Ferstenberg et al. | 705/37 |
| 5,911,136 | A | 6/1999 | Atkins | 705/36 |
| 5,960,411 | A | 9/1999 | Hartman et al. | 705/26 |
| 6,012,044 | A | 1/2000 | Maggioncalda et al. | 705/36 |
| 6,021,397 | A | 2/2000 | Jones et al. | 705/36 |
| 7,016,870 | B1 * | 3/2006 | Jones et al. | 705/35 |
| 7,149,713 | B2 * | 12/2006 | Bove et al. | 705/35 |
| 2002/0002521 | A1 * | 1/2002 | Shearer et al. | |
| 2002/0038273 | A1 * | 3/2002 | Wherry et al. | 705/36 |
| 2002/0095362 | A1 * | 7/2002 | Masand et al. | |
| 2005/0154658 | A1 * | 7/2005 | Bove et al. | 705/35 |

FOREIGN PATENT DOCUMENTS

| JP | 6035918 | 2/1994 | 15/21 |
|---|---|---|---|
| WO | WO 99/23592 | 10/1998 | 17/60 |
| WO | WO 00/16226 | 9/1999 | 17/60 |

OTHER PUBLICATIONS

U.S. Appl. No. 60/184,408, filed Feb. 23, 2000.*
U.S. Appl. No. 60/200,652, filed Apr. 28, 2000.*
U.S. Appl. No. 60/218,105.*
U.S. Appl. No. 60/184,408.*
Time to rebalance investment portfolio; [Final Edition] Mike Grenby. Times—Colonist. Victoria, B.C.: Jun. 20, 1999. p. C.4.*

(Continued)

Primary Examiner—Lalita M Hamilton
(74) Attorney, Agent, or Firm—Saul Ewing LLP; John Pivnichny

(57) ABSTRACT

A system and method capable of automatically rebalancing financial portfolios to optimality, are disclosed. Using stored customer-defined optimization data, the system determines if the current portfolio is imbalanced beyond a customer-defined tolerance level and if so, it transmits a "rebalancing-needed" alert message and a list of recommended rebalancing transactions via customer-defined communications methods. The customer reads the message and decides if he wishes to authorize portfolio rebalancing. To authorize portfolio rebalancing, the customer merely responds to the alert message. In a preferred embodiment, the customer's response may constitute performing a single action, such as pressing a button or speaking a sound. After the authenticity of the received customer response is verified, the system implements the customer's single response by transmitting execution instructions to an electronic trading system, which in turn executes the rebalancing transactions to optimize the portfolio.

26 Claims, 3 Drawing Sheets

OTHER PUBLICATIONS

Mutual funds getting more on-line action; [Final Edition] Sandra Block. USA Today. McLean, Va.: Jun. 18, 1998. p. 01.B.*
"U.S. Appl. No. 60/843,049, filed Sep. 8. 2006".
"U.S. Appl. No. 10/788,207, filed Feb. 27, 2004".
"U.S. Appl. No. 11/976,886, filed Oct. 29, 2007".

Raimond Maurer, Shohreh Valiani, Hedging the exchange rate risk in international portfolio diversification; Currency forwards versus currency options. Managerial Finance. Patrington: 2007. vol. 33 Iss. 9; p. 667.
U.S. Appl. No. 60/450,664, filed Mar. 3, 2003.

* cited by examiner

SYSTEM AND METHOD FOR AUTOMATICALLY REBALANCING PORTFOLIOS BY SINGLE RESPONSE

RELATED APPLICATIONS

The present application relates to a copending U.S. patent application Ser. No. 09/460,608 entitled "Internet-Based System For Calculating Optimal Equity Portfolios," filed on Dec. 14, 1999, hereby fully incorporated by reference, and to a copending U.S. patent application entitled "System And Method Of Solving Optimization Problems Using Prestored Advanced Bases," concurrently filed with the present application on Oct. 10, 2000, hereby fully incorporated by reference.

BACKGROUND OF THE INVENTION

1. Field of the Invention

The present invention relates to a method and system for optimizing portfolios of assets and, more particularly, to a method and system for automatically rebalancing portfolios of assets to achieve optimality, whereby all recommended rebalancing trade transactions can be automatically implemented based on a customer's single response to an alert message.

2. Description of the Related Art

In the 1950's Harry Markowitz and others developed modern portfolio theory (MPT). At the foundation of MPT is the well-known concept of the "efficient frontier." The efficient frontier is described as the optimal combination of feasible risk and return in the market, and is defined by a set of points each representing the maximum possible expected return for a given level of risk, the lowest level of risk given a certain expected return, or a combination thereof. In MPT, an optimal portfolio is achieved if its risk-return characteristics match those of the efficient frontier.

Financial advisory and management system for analyzing and managing financial portfolios are available to individual investors and institutional investors. Using sophisticated computerized mathematical models and algorithms, these systems are configured to assess the current risk-return characteristics of a portfolio, calculate the optimal level of the portfolio based on the market volatility and an investor's risk tolerance level, and determine a series of trading transactions (e.g., buying and selling specific stocks) which would help the imbalanced portfolio reach its optimal level.

An example of such a financial advisory system available to institutional investors is disclosed in U.S. Pat. No. 6,021,397 to Jones et al., incorporated fully herein by reference. The Jones system performs portfolio optimization to determine a set of financial products that maximizes the financial goals of a customer, and alerts the customer when the current portfolio has shifted from its optimal level. An attempt to provide an analogous system to individual investors for the purpose of constructing an optimal portfolio of mutual funds is found in U.S. Pat. No. 5,918,217 to Maggioncalda et. al, incorporated fully herein by reference. The Maggioncalda system provides a customer with the ability to interactively explore how changes in one or more parameters such as risk tolerance, savings level, and/or retirement age affect one or more outcomes such as a probability of achieving a financial goal, or how changes in these parameters may affect short-term risk. The Maggioncalda system determines a combination of financial products that optimizes the customer's portfolio and graphically depicts the recommended optimal allocation of wealth among the available set of financial products.

U.S. Pat. No. 5,644,727 to Atkins describes a different financial management system, which is hereby fully incorporated by reference. The Atkins system allows a customer to manage a plurality of different financial accounts (e.g., mortgage account, loan account), perform financial analyses of the accounts, and invest appropriate assets based on the financial analyses. The customer places each individual transaction order to a master computer, wherein the transaction order is processed.

The above-described systems adequately allow customers to track and analyze their investments and investment scenarios; however, they do not provide any effective means by which the customer can actually implement all of the recommended financial transactions in a timely fashion. Time is of essence when responding to the market volatility. Any advice offered by these systems becomes wasted and if the customer is unable to actually implement the advice in a timely manner. Absent such implementation tools, the customer may forfeit valuable opportunity to maximize his profit and may suffer financial loss at the time of a market change.

In view of these and other problems of conventional financial systems and methods, a technique needs to be developed by which recommended portfolio rebalancing transactions can be almost instantaneously and systematically implemented once a customer communicates a decision to rebalance his portfolio. Further, a technique is needed by which a customer can easily and confidently place a portfolio rebalancing order at any time and place it without having to monitor his portfolio or market changes.

SUMMARY OF THE INVENTION

An object of the present invention is to provide a system and method capable of automatically rebalancing financial portfolios to optimality upon receipt of a customer's single response to an alert message. The system pre-stores customer-defined optimization data, such as expected return level, constraint on stocks, etc., and information on customer's selected methods of communication. Using the stored customer-defined optimization data, the system performs optimization calculations and determines if the current portfolio is imbalanced beyond a customer-defined tolerance level. If so, the system transmits a "rebalancing-needed" alert message and a list of recommended rebalancing trade transactions (e.g., buy and sell a specific number of different stocks) via the customer-selected communications methods such as an e-mail, a pager signal. The customer reads or otherwise processes the message and decides if he wishes to authorize portfolio rebalancing. To authorize portfolio rebalancing, the customer merely needs to respond to the alert message, e.g., by transmitting a return e-mail. In a preferred embodiment, the customer's response may constitute performing a single action, such as pressing a button or speaking a sound. After the authenticity of the received customer response is verified, the system implements the customer response by generating and transmitting execution instructions to an electronic trading system, which in turn executes the rebalancing transactions. Accordingly, the present invention provides a unique technique by which all necessary rebalancing trade transactions can be automatically implemented based on a customer's single response to an alert message indicating the need to rebalance portfolio.

Briefly described, the present invention is directed to a computer-implemented method of rebalancing a portfolio of assets to achieve optimality, the method comprising the steps of transmitting an alert message for alerting an imbalance status of a customer's portfolio, and a list of recommended rebalancing transactions, to a customer; receiving a single response of the customer to the transmitted alert message; and automatically implementing the list of recommended rebalancing transactions based on the received customer's response.

Further, the present invention is directed to a computer-implemented system of rebalancing a portfolio of assets to achieve optimality, the system comprising a first unit for determining an imbalance status of a customer's portfolio and preparing an alert message to alert the customer and a list of recommended rebalancing transactions that optimizes the portfolio; and a second unit for transmitting the alert message and the list of recommended rebalancing transactions to the customer, receiving a single response of the customer to the transmitted alert message, and automatically implementing the list of recommended rebalancing transactions based on the received customer's response.

The present invention is also directed to a computer-implemented method of addressing a certain status of an item, the method comprising the steps of monitoring a current status of the item based on user-defined parameters; automatically triggering transmission of an alert message to a user based on the user-defined parameters if the current status of the item has shifted to a second status; receiving a single response of the user to the alert message; and automatically performing a plurality of predetermined actions in response to the single response from the user.

Other objects and advantages of the present invention will be set forth in part in the description and the drawings which follow, and, in part, will be obvious from the description or may be learned by practice of the invention.

DETAILED DESCRIPTION OF THE PREFERRED EMBODIMENTS

Figure 1:
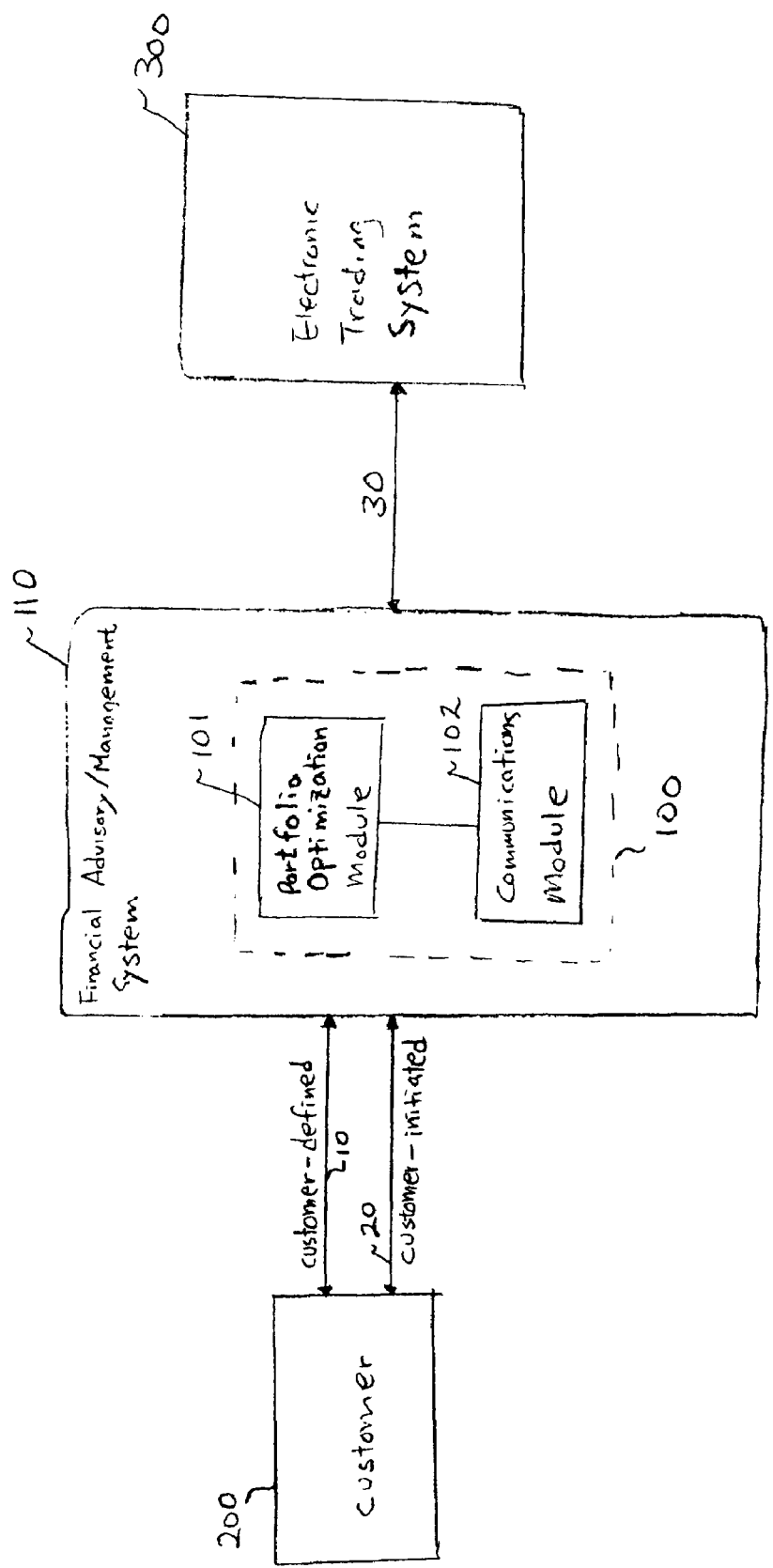
FIG. 1 is a schematic of a portfolio rebalancing system according to a preferred embodiment of the present invention.

FIG. 1 illustrates a schematic of a portfolio rebalancing system according to a preferred embodiment of the present invention. As illustrated in FIG. 1, a portfolio rebalancing system 100 includes a portfolio optimization module 101 and a communications module 102, all operatively connected. In this example, the portfolio rebalancing system 100 is implemented in a financial advisory system or a financial management system 110 which is, in a general sense, well known in the art. The financial advisory/management system 110 provides analyses of financial portfolios pertaining to a customer and recommends trading transactions that optimize the portfolios. Examples of such financial advisory/management systems have been discussed above referring to U.S. Pat. No. 6,021,397 to Jones et al., U.S. Pat. No. 6,012,044 to Maggioncalda et al., and U.S. Pat. No. 5,644,727 to Atkins.

The portfolio rebalancing system 100 communicates with a customer 200 via customer-defined communications methods 10 and customer-initiated communications methods 20. The customer defined communications methods 10 are communications methods (e.g., an e-mail method, a personal digital assistant (PDA) method, a phone method, a pager method, a facsimile method, a postal mail method, and any other known communications method) which the customer 200 has selected to receive alert messages from the rebalancing system 100. The customer-initiated methods 20 are communications methods (e.g., via a Web site) which the customer 200 uses to initiate communication with the rebalancing system 100. These methods 10 and 20 are not mutually exclusive.

The customer 200 can be an individual investor, an institutional investor, a broker, or any entity that has the authority to render decisions affecting the financial state of portfolio. The portfolio rebalancing system 100 also communicates with an electronic trading system 300, well known in the art, using a communications method 30 such as a communications network. The electronic trading system 300 allows trades to be executed electronically; NASDAQ is an example of one such system. The communications module 102 controls communications between the customer 200 and the portfolio rebalancing system 100 and between the electronic trading system 300 and the portfolio rebalancing system 100.

The portfolio optimization module 101 performs optimization functions that are well known in the art. For example, the optimization functions may include the function of determining if the current portfolio is imbalanced using certain optimality criteria set by the customer and thus requires rebalancing, and the function of determining financial transactions that will optimize the current portfolio. The portfolio optimization module 101 may utilize prestored advanced bases to quickly calculate optimization solutions, which is the subject matter of the related copending application entitled "System and Method for Solving Optimization Problems using Prestored Advanced Bases." The optimization module 101 may calculate optimal portfolios using customer data received via a communications network, which is the subject matter of the related copending application, U.S. patent application Ser. No. 09/460,608, entitled "Internet-Based System For Calculating Optimal Equity Portfolios," The optimization module 101 can incorporate all or part of the subject matter of these copending applications to calculate optimization solutions. In the alternative, the portfolio optimization module 101 may incorporate the operations and functions of conventional optimization modules, such as those employed in the financial advisory systems disclosed in the Jones et al. patent and the Maggioncalda et al. patent.

Figure 2:
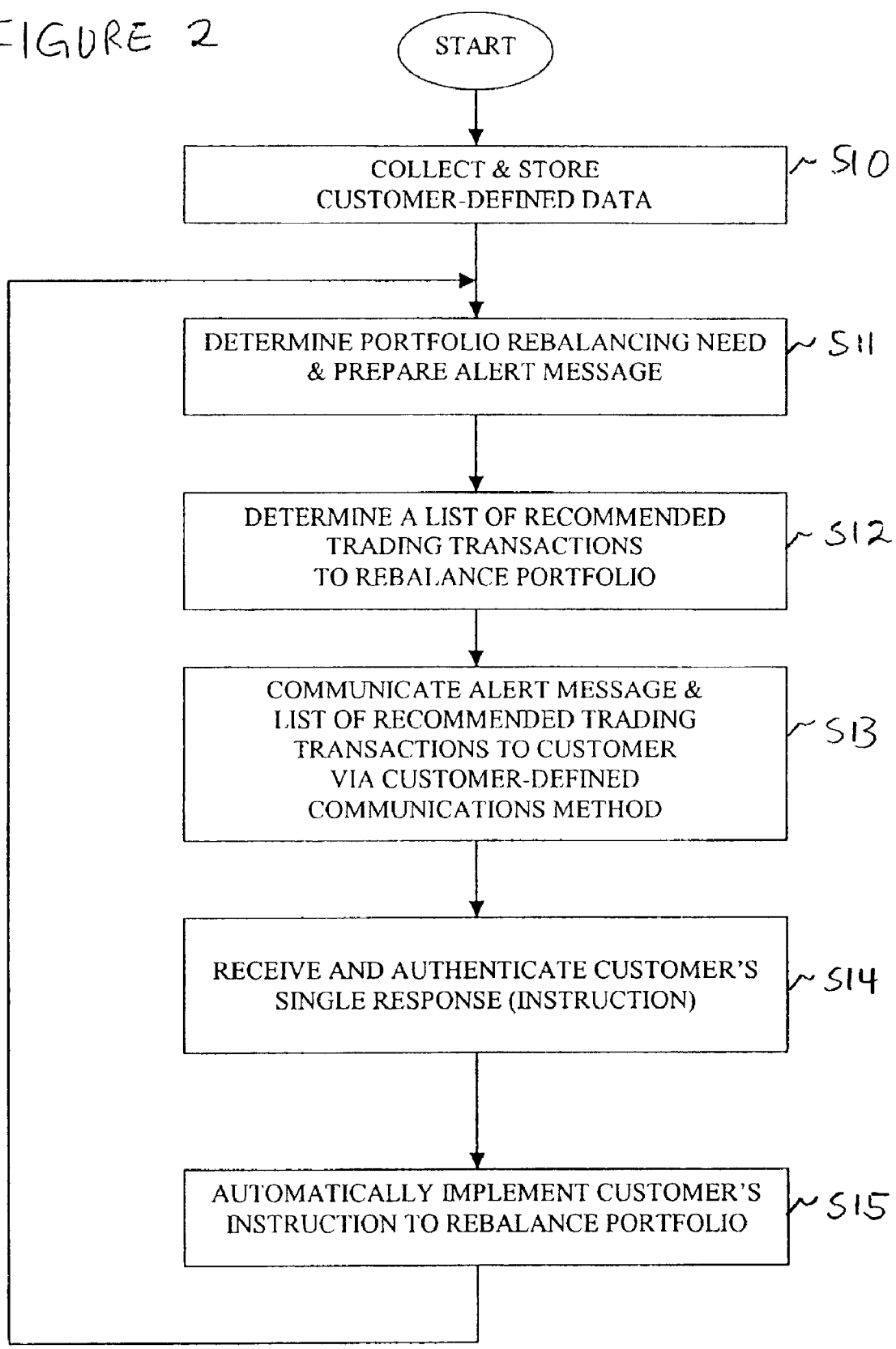
FIG. 2 is a flowchart illustrating the processing steps of a portfolio rebalancing method according to a preferred embodiment of the present invention.

FIG. 2 is a flowchart illustrating the processing steps of a portfolio rebalancing method according to a preferred embodiment of the present invention. In Step S10, the customer 200 receives a query from the rebalancing system 100 requesting input from the customer to define certain processing parameters that the system will 100 utilize. The processing parameters may include, but are not limited to, optimization parameters, communication parameters, and imbalance tolerance parameters.

The optimization parameters are utilized by the optimization module 101 to compute optimization solutions. These parameters may identify the customer's desired return level, financial goals, risk tolerance level, constraints imposed on specific stocks, and other customer-preferred criteria. In addition, the frequency in performing optimization calculations can be dictated by the customer 200, such that the customer 200 can control how many times the system 100 monitors his portfolio each day.

The communications parameters, such as the customer's preferred methods of communication, are used by the rebalancing system 100 in determining how the alert message should be communicated to the customer 200. The customer 200 selects one or more communications methods that he prefers, as well as the priority, order and timing of communication between the customer 200 and the rebalancing system 100. For example, among various types of communications methods, the customer 200 may select an e-mail method to be of a first priority and order, a two-way pager method to be of a second priority and order, and a facsimile method to be of a third priority and order. When a "rebalancing-needed" alert message needs to be communicated to the customer 200, the alert message is first sent via the e-mail method, i.e., in an e-mail. If the system 100 detects that the transmitted e-mail has been opened, then the system 100 presumes a successful receipt of the message by the customer 200. If, however, the system 100 detects that the transmitted e-mail has not been opened after a certain time period has elapsed, the system 100 presumes that the message has not been received by the customer 100 and automatically transmits the same message via the second priority method, i.e., to a two-way pager of the customer. If the system 100 determines that the message transmitted to the pager has not been successfully transmitted to the customer, the system 100 tries the next priority communications method. This process continues until a successful receipt of the message by the customer can be confirmed. The customer 200 can set the system 100 so that it simultaneously transmits the alert message via two or more communications methods. The customer 200 can also set the time duration between a first transmission of the message and subsequent transmissions of the message.

In addition to defining the manner in which the customer 200 receives the alert message, the customer 200 may also define imbalance tolerance parameters identifying the imbalance tolerance level of the customer 20. The imbalance tolerance level dictates how tolerant the system 100 may be when an imbalance in the portfolio is detected. By setting the imbalance tolerance level, the customer sets the alert level for receiving an alert message. If the portfolio's imbalance level exceeds the imbalance tolerance level (i.e., if the portfolio is not in its optimal level), the system 100 is configured to transmit an alert message to the customer 200 for notifying the need to rebalance the portfolio.

At the completion of Step S10, the customer defined data including the optimization parameters, communications parameters, and imbalance tolerance parameters, are stored in the rebalancing system 100.

In Step S11, it is determined if the current portfolio of the customer is imbalanced beyond the customer-defined tolerance level. This is accomplished, in preferred embodiment, by running a program on the optimization module 101 which compares the current portfolio with an optimal portfolio. When the current portfolio's imbalance level exceeds the customer-defined tolerance level, the optimization module 101 determines that the portfolio needs to be rebalanced and generates an alert message describing the rebalancing need. In Step S12, a list is compiled of recommended trading transactions which will optimize the current portfolio if executed. The recommended trading transactions (or "rebalancing" transactions) may include a series of buy and sell transactions for purchasing and selling different stocks and other financial assets. Similar to the balance determination of Step S11, the list compiling step of Step S12 is accomplished in the preferred embodiment by execution of a program residing on the optimization module 101; many optimization programs for performing this function are known and the specific program used is not the focus of this invention.

In Step S13, once the alert message and the list of recommended rebalancing transactions are prepared, the communications module 102 facilitates the transmissions of the alert message and the list to the customer 200 via the user-defined communications methods 10 according to the communications parameters stored in Step S10. The portfolio rebalancing system 100 is configured to initiate the transmission of the alert message and the list of recommended rebalancing transactions only through the customer-defined communications methods 10. This technique ensures that sensitive materials, such as the customer's financial information, are transmitted only through those communications mediums that have been authorized by the customer 200. In the alternative, however, if desired the customer 200 may choose to initiate communication with the rebalancing system 100 via any one of the customer-initiated communications methods 20 in order to access the same alert message and the list of recommended rebalancing transactions.

The alert message transmitted to the customer 200 describes the detected condition of the customer's current portfolio (e.g., amount of deviation from its optimal condition) and requests that the customer 200 decide whether or not he wishes to authorize rebalancing of the portfolio through the execution of the recommended rebalancing transaction(s). An exemplary question such as "Do you want to rebalance your portfolio to its optimal condition as suggested?" may be used to solicit a decision from the customer 200. The alert message also includes instructions on how to communicate a customer's decision back to the rebalancing system 100, and verification information to be used subsequently to verify the identity of the responder and/or the authenticity of the received decision using known verification processes.

In the preferred embodiment, if the customer 200 decides he does not wish to rebalance his portfolio, the customer ignores the alert message. If the customer 200 does not respond to the alert message within a predetermined time period, the rebalancing system 100 treats the silence as a rejection disapproving execution of the rebalancing transactions. If, on the other hand, the customer 200 decides to authorize rebalancing of the portfolio, the customer 200 responds to the alert message by, for example, replying to the received e-mail. It is important to note that only a single response to the alert message is needed to trigger portfolio rebalancing. In the preferred embodiment, the customer's single response is transmitted to the rebalancing system 100 via the same communications method 10 used to transmit the alert message to the customer 200. Thus, the customer 200 may respond to the alert message by performing only a single action, e.g., pressing a button, speaking a sound, or touching a screen portion.

In Step S14, the customer's single response is received by the communications module 102 and is recognized using known verification processes to be a customer's instruction to perform portfolio rebalancing. Certain verification steps for verifying the authenticity of the response and/or the identity of the customer 200 are then performed, which may vary depending on the type of communications method used.

In Step S15, in response to the customer's rebalance instruction and after the verification steps have been successfully completed, the communications module 102 automatically implements the instruction by, for example, running an instruction execution program configured to do so. More specifically, the communications module 102 generates and transmits electronic instructions to the electronic trading system 300 via the communications method 30. These instructions specify the recommended rebalancing transactions to be executed. The electronic trading system 300 executes the recommended rebalancing transactions pursuant to the received electronic instructions. The execution of the rebalancing transactions causes the portfolio to be at its optimal level once again. A confirmation message is generated by a confirmation message processor on the communicating module 102 and transmitted to the customer 200 upon a successful execution of the rebalancing transactions.

Once the portfolio has been optimized, the process returns to Step S11 (unless otherwise set by the customer 200) and the process is repeated continuously to maintain the portfolio at its optimal level.

Figure 3A:
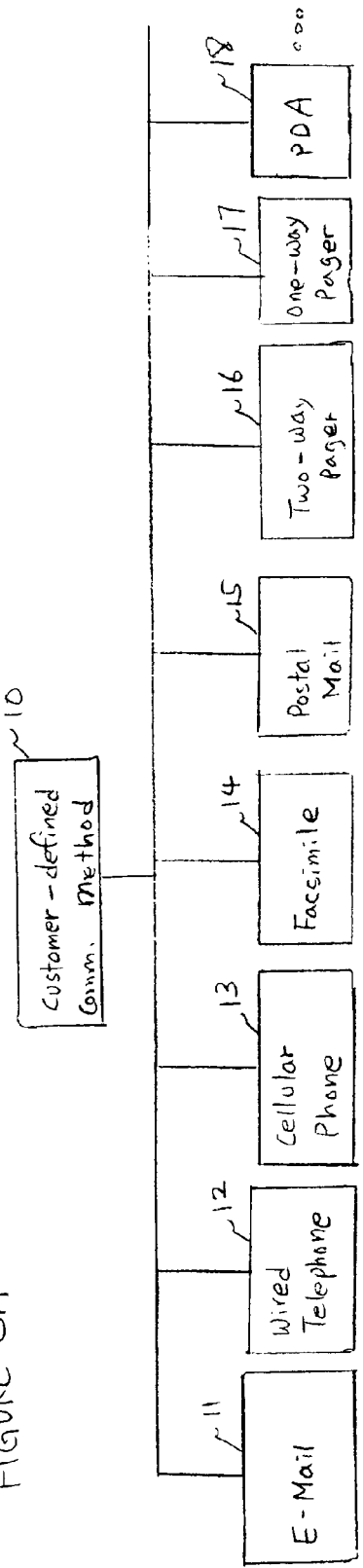
FIGS. 3A and 3B illustrate examples of communications methods according to a preferred embodiment of the present invention.

The implementation of Steps S13-S15 using different communications methods 10 will now be described in detail. FIG. 3A illustrates examples of communications methods, one or more of which may be selected by the customer 200 as his preferred methods of communication (i.e., as customer-defined communications methods 10). As illustrated in FIG. 3A, a list of possible customer-defined communications methods 10 includes an e-mail method 11, a wired telephone method 12, a cellular phone method 13, a facsimile method 14, a postal mail method 15, a two-way pager method 16, a one-way pager method 17 and a PDA method 18. Additional communications methods may be added to this list and selected by the customer 200 as his preferred communications method.

If the customer 200 defines the e-mail method 11 as his preferred method of communication, the prepared alert message and the list of recommended rebalancing transactions are transmitted to the customer 200 in an e-mail to one or more e-mail addresses provided by the customer 200. In this example, the alert message includes a transaction number or an identification number to be used for verifying the authenticity of the customer's response and/or the identity of the customer 200. The e-mail address(es) can be linked to a communications network such as the Internet or to the personal Web pages of the customer 200. The customer 200 receives the e-mail and reviews the contents of the e-mail. After reviewing the e-mail and if the customer 200 wishes to authorize rebalancing of the portfolio through the execution of the recommended rebalancing transactions, the customer 200 transmits a return e-mail, as his response, to the rebalancing system 100. The return e-mail automatically includes the transaction number that was included in the original e-mail. The customer's response here constitutes a single action, i.e., pressing a "reply" button shown on the e-mail menu. The communications module 102 receives the return e-mail response from the customer, verifies the transaction number enclosed in the return e-mail with a prestored transaction number, and automatically implements execution of the recommended rebalancing transactions when the transaction numbers match as discussed in Step S15 of FIG. 2.

Using the wired telephone method 12, the alert message and the list of recommended rebalancing transactions are transmitted to a wired telephone phone of the customer 200. In a preferred embodiment, the communications module 102 includes a voice response unit (e.g., ViaVoice™ from IBM) for generating voice messages and deciphering voice responses. The voice response unit transforms the alert message and the list of recommended rebalancing transactions into a voice message, automatically dials the customer's telephone number, and transmits the voice message to the customer's phone. Prior to broadcasting the voice message, the voice response unit may require an input of a customer's account number, password or other personal information to verify the identity of the customer who answers the call. The customer 200 may input the verification information by speaking or pressing buttons. The voice message instructs the customer 200 to press a button or speak a sound (e.g., "yes") if the customer 200 approves rebalancing of his portfolio. To reject the message, the customer 200 can press a button or speak a sound (e.g., "no"), or just hang up the phone. The customer's single response, whether be in the act of pressing a button or speaking a sound, is transmitted to the communications module 102, which processes the response as discussed in Step S15 of FIG. 2. In the alternative, it is possible for an individual supervising the rebalancing system 100 to place a personal call to the customer 200 to communicate the alert message and the recommended rebalancing transactions. In this case, the customer 200 transmits a verbal instruction to perform rebalancing of the portfolio during the personal call. The cellular phone method 13 is identical to the wired telephone phone method 12, except for the use of a customer's cellular phone, instead of a wired telephone, and the use of the wireless communications technology, to communicate with the customer 200.

If the facsimile method 14 were to be used in Step S13 of FIG. 2, a facsimile sheet is prepared and transmitted to the customer 200 at a given facsimile number. In a preferred embodiment, the facsimile sheet contains an alert message, a list of recommended rebalancing transactions, a signature block and an optical code (e.g., barcode or OCR). The optical code contains the portfolio account number of the customer 200 or a transaction number. The customer 200 receives the facsimile sheet, reviews it and responds to the alert message by signing at the signature block only if he desires rebalancing of his portfolio. The customer 200 then transmits the signed facsimile sheet to the rebalancing system 100 via facsimile. Upon receipt of the signed sheet, the optical code thereon is either automatically or manually scanned, which allows the communications module 102 to retrieve the customer's account information including the list of recommended rebalancing transactions and a prestored customer signature. The signature block can be either automatically or manually compared with the prestored customer signature to verify the identity of the customer 200. In addition, the facsimile sheet transmitted to the customer 200 may include a password block to be filled out by the customer 200, which is utilized to further verify the identity of the customer 200. Once the verification has been completed, the customer's response is automatically implemented as discussed in Step S15 of FIG. 2.

The postal mail method 15 is similar to the facsimile method 14. Using the postal mail method 15, an alert message and a list of recommended rebalancing transactions are transmitted via a postal mail (e.g., Federal Express, US Postal Service Mail) with a return page. Similar to the facsimile page, the return page includes a signature box, an optical code and an optionally provided password box. Upon receipt of the mail, the customer 200 responds to the mail by signing his name in the signature box of the return page only if the customer 200 desires rebalancing of his portfolio. The customer 200 may provide other data (e.g., password) to be used in the verification step. The signed page is transmitted back to the rebalancing system 100 via postal mail or facsimile, and processed in the same manner as the signed facsimile sheet as discussed above.

Using the two-way pager method 16, an alert message and a list of recommended rebalancing transactions are transmitted to a customer's two-way pager. If the customer 200 wishes to rebalance his portfolio, then the customer 200 responds to the alert message by pressing a designated button on his pager to generate and transmit a single instruction to rebalance the portfolio. In addition, the customer 200 may be required to input a password or other personal information so that the identity of a responder can be verified. Upon receipt of the customer's response, rebalancing of the portfolio is executed as discussed in Step S15 of FIG. 2.

Using the one-way pager method 17, a alert message and a list of recommended rebalancing transactions are transmitted to a customer's one-way pager. The alert message includes a telephone number, and an identification number to be used for verifying the identity of the customer. Only if the customer 200 wishes to authorize portfolio rebalancing, the customer 200 responds to the alert message by calling the given telephone number. The customer 200 can ignore the message on his pager which he does not desire rebalancing of the portfolio. Once the customer's response call is connected, the communications module 102 broadcasts a prepared voice message instructing the customer 200 to input the given identification number shown on the pager, e.g., by pressing buttons or speaking the identification number. The communications module 102 verifies the identity of the customer 200 by comparing the received identification number with a stored identification number. Upon a successful completion of the verification step, the customer's rebalance instruction is implemented as discussed in Step 15 of FIG. 2.

In the PDA method 18, two types of PDAs, a one-way PDA and a two-way PDA, can be used. The one-way PDA method is identical to the one-way pager method 17, except that the rebalancing system 100 communicates with the customer 200 via a one-way PDA of the customer 200, instead of a one-way pager. The two-way PDA method is identical to the two-way pager method 16, except that the rebalancing system 100 communicates with the customer 200 via a two-way PDA of the customer 200, instead of a two-way pager.

Figure 3B:
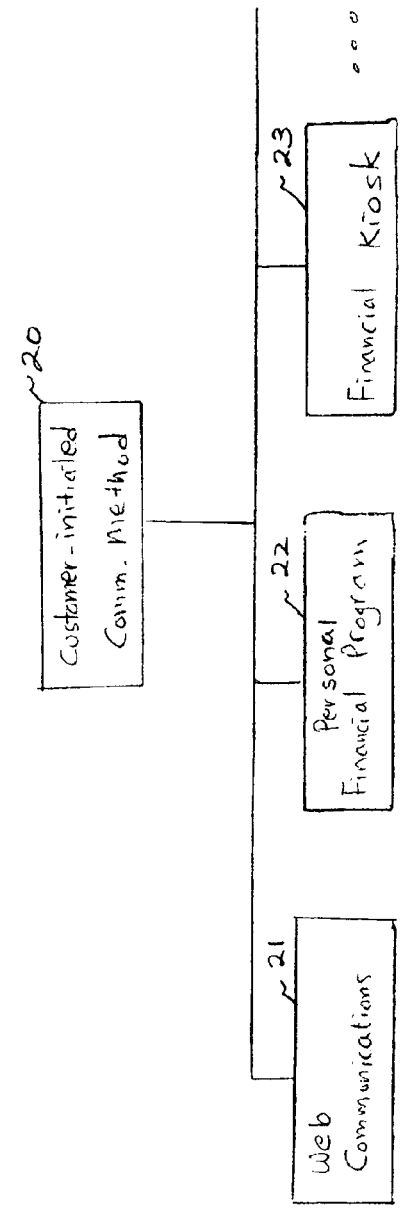

In addition to receiving the alert message and the list of recommended rebalancing transactions via the customer-defined communications method 10, the customer 200 can initiate access to the same information via the customer-initiated communications methods 20. The customer-initiated communications methods 20 may include, but are not limited to, a Web communications method 21, a personal financial program method 22, and a financial Kiosk method 23 as illustrated in FIG. 3B.

In the Web communications method 21, communications between the customer 200 and the rebalancing system 100 are engaged via a communications network such as the Internet or WWW, using the well known Internet or Web technologies. For example, the customer 200 can download and access his portfolio information at any time by logging-on to a designated Web site of the rebalancing system 100. The login process may involve an input of a customer's portfolio account number, a password or any other verification information, which is relied on to verify the identity of the customer 200. Portfolio information accessible by the customer 200 may include an alert message and a list of recommended rebalancing transactions, which are prepared in Steps S11 and S12 of FIG. 2. In a preferred embodiment, the communications module 102 may cause a Web message to be displayed on the personal Web pages of the customer 200. The Web message can include the alert message, the list of recommended rebalancing transactions, and a "rebalancing" button. When the customer 200 reads the Web message and decides to authorize rebalancing of his portfolio, the customer 200 responds to the message by clicking on the "rebalancing" button. The single act of clicking on the "rebalance" button automatically causes a rebalance instruction to be transmitted to the communications module 102, which implements the instruction as discussed in Step S15 of FIG. 2.

The financial program method 22 incorporates the well known Internet or Web technologies implemented in the Web communications method 21. The financial program method 22 operates similarly to the Web communications method 21, except for the use of a customer's financial program installed on the customer's computer to interface communications between the customer 200 and the rebalancing system 100. Various types of financial programs are well known in the art, e.g., Quicken and MS Money. In a preferred embodiment, when the customer 200 downloads his portfolio information (including the alert message and the list of recommended rebalancing transactions) from the rebalancing system 100, it is stored, processed and presented to the customer by the customer's financial program. The customer's financial program can be configured to reformat the downloaded portfolio information for enhanced readability or to integrate the portfolio information with other financial data stored in the financial program. By performing a single action such as clicking on a button, the customer 200 transmits a rebalance instruction to the system 100, which processes the instruction as discussed in Step S15 of FIG. 2.

In the financial Kiosk method 23, a financial Kiosk well known in the art functions as an interface between the rebalancing system 100 and the customer 200. The financial Kiosk may be an on-site Kiosk located near the financial management system 110, or may be an off-site Kiosk located at a remote site. The financial Kiosk may communicate with the rebalancing system 100 via "hard-wired" electrical lines, wireless technology, or a communications network such as the Internet. The financial Kiosk may include a touch-sensitive screen or other well known input devices.

Using a financial Kiosk, the customer 200 logs-on to the system 100 by entering an account number and a password. After the login, customer's portfolio rebalancing information is downloaded and displayed to the customer 200. The customer's rebalancing information includes an alert message and a list of recommended rebalancing transactions prepared in Steps S11 and S12 of FIG. 2. The customer is instructed by the Kiosk program to perform a single action if he wishes to authorize rebalancing of his portfolio in view of the recommended rebalancing transactions. The single action may constitute the act of pressing a "rebalancing" touch button, speaking a sound, or performing any other designated activity. When the customer performs this single action (e.g., by pressing a "rebalancing" touch button"), this single response of the customer is automatically transmitted to the communications module 102, which processes the instruction as discussed in Step S15 of FIG. 2.

In addition to the above described communications methods 10, the rebalancing system 100 may communicate the alert message and the rebalancing transaction list with the customer 200 via other communications methods and devices, such as a remote control, a portable computer, a handheld device, and a two-way radio.

The present invention offers many advantages. For example, in the present invention the customer only needs to respond to an alert message in order to automatically and simultaneously implement a series of rebalancing transactions that will optimize his portfolio. Since the system is pre-configured to recognize the customer's response and knows how to implement it, it is unnecessary for the customer to provide detailed instructions on how to rebalance his portfolio.

As a result, the present invention provides an extremely convenient and effective way for investors and brokers to accomplish portfolio rebalancing.

Further, if the current portfolio becomes imbalanced beyond a customer's defined tolerance level, then the customer is immediately notified of the need to rebalance his portfolio via a customer-defined communications method, with a list of recommended trading transactions that optimizes the portfolio. Because the rebalancing need is communicated to the customer via the customer-defined communications method, the customer has full control over the transmission of sensitive materials such as his personal finance information, and the customer is much more likely to read the communicated message, thereby increasing the effectiveness of the present invention.

In addition, the customer can set and modify an imbalance tolerance level used to determine whether or not the portfolio needs to be rebalanced. This is an extremely valuable technique that augments the effort of addressing the specific needs and preferences of each investor. Each customer can dictate how sensitive or insensitive the system may act with respect to determining the rebalancing need of his portfolio. The customer can set the tolerance level low, causing the system to be coarsely sensitive, or can set it high, causing the system to be extremely sensitive. For example, if a customer is in the office, the customer may set the tolerance level high so that he will be notified of the rebalancing need for any small market movement. By contrast, if the customer is on extended vacation, the customer may set the tolerance level low so that he will be notified only in case of very major market movements.

Further still, if the system determines that an alert message has not been successfully received by the customer, the system transmits the same alert message via a next customer-defined communications method until the system determines that the customer has successfully received the alert message. Having this kind of back-up system increases the likelihood of communicating the rebalancing need to the customer in a timely fashion. Also, since the customer determines the order, timing, and priority of the communication between the customer and the system, the customer has full control over the manner, median, and time frame in which the customer receives the alert message.

Furthermore, by setting up the imbalance tolerance level that triggers a communication with an investor customer, the brokerage can meet its fiduciary responsibility to its clients with a minimum amount of effort, but in an effective way which will also serve to address certain concerns of the SEC.

Although the present invention has been described with respect to portfolio optimization, the present invention is applicable to any situation which requires execution of a series of actions by a single response from a user. For example, in applying the present invention in flight cancellation situations, the system of the present invention may notify a customer when his flight has been cancelled by transmitting an alert message and a list of recommended actions based on customer defined data, receive a single response from the customer, and automatically execute the recommended actions upon receipt of the customer's response. The recommended actions can include, e.g., cancelling hotel reservations, vehicle rental reservations, and restaurant reservations. In another example, the present invention can be used to automatically re-initialize a server when the server goes down. When the system detects the server to be down, it can automatically transmit an alert message to an appropriate individual with a list of recommended actions. The individual responds to the alert message. Upon receipt of the single response from the individual, the system automatically implements the list of recommended actions. In this example, the recommended actions can include, e.g., rebooting all relevant computers and re-initializing communications controls and transmission lines.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A computer-implemented method of rebalancing a portfolio of assets to achieve optimality, the method comprising:
   transmitting to a customer an alert message for alerting an imbalance status of a customer's portfolio, and a list comprising at least one recommended rebalancing transaction, each recommended rebalancing transaction comprising asset information identifying a specific asset, quantity information identifying a specific number of units of the specific asset, and transaction information comprising one of a buy instruction and a sell instruction, wherein the transmitting is performed via a first customer-defined communications method;
   receiving from the customer a single response to the transmitted alert message; and
   automatically implementing the list comprising at least one recommended rebalancing transaction based on the received customer's response to cause execution of each recommended rebalancing transaction.

2. The computer implemented method of claim 1, further comprising:
   automatically retransmitting the alert message and the list comprising at least one recommended rebalancing transaction to the customer via a second customer-defined communications method if the step of transmitting via the first communications method was not successfully executed.

3. The computer implemented method of claim 1, wherein the customer's response constitutes performing a single action by the customer.

4. The computer implemented method of claim 3, wherein the single action comprises one of the following: pressing a button, touching a portion of a screen, or speaking a sound.

5. The computer implemented method of claim 1, further comprising: verifying the identify of the customer prior to the implementing step.

6. The computer implemented method of claim 1, wherein the verifying is performed automatically by a computer system.

7. The computer implemented method of claim 1, wherein the alert message is generated based on an alert level set by the customer.

8. The computer implemented method of claim 1, wherein the implementing step includes:
   generating execution instructions based on the list comprising at least one recommended rebalancing transaction; and
   transmitting the execution instructions to an electronic trading system, whereby each respective transaction of the list comprising at least one recommended rebalancing transaction is executed electronically.

9. The computer implemented method of claim 1, wherein the customer's response is contained in a return e-mail from the customer, wherein the return e-mail includes a transaction number identifying the list comprising at least one recommended rebalancing transaction.

10. The computer implemented method of claim 1, wherein the customer's response is received on paper, and wherein the paper includes an optical code for retrieving the list comprising at least one recommended rebalancing transaction, and verification information for verifying the identity of the customer.

11. The computer implemented method of claim 1, wherein the customer's response is received as a voice sound, wherein the voice sound is recognized using a voice recognition device.

12. The computer implemented method of claim 1, wherein the customer's response is received through a wireless communications network.

13. The computer implemented method of claim 1, wherein the customer's response is received from a financial Kiosk.

14. The computer implemented method of claim 1, wherein the customer's response is received from a computer of the customer using a financial program installed on the computer.

15. A computer-implemented system of rebalancing a portfolio of assets to achieve optimality, the system comprising:
 a first unit for determining an imbalance status of a customer's portfolio and preparing an alert message to alert the customer and a list comprising a plurality of recommended rebalancing transactions that optimizes the portfolio; and
 a second unit for transmitting the alert message and the list comprising the plurality of recommended rebalancing transactions to the customer, receiving a single response of the customer to the transmitted alert message, and automatically implementing each transaction of the list comprising the plurality of recommended rebalancing transactions based on the received customer's response, wherein the second unit transmits the alert message and the list comprising the plurality of recommended rebalancing transactions via a first customer-defined communications method.

16. The computer implemented system of claim 15, wherein the second unit automatically transmits the alert message and the list comprising the plurality of recommended rebalancing transactions to the customer via a second customer-defined communications method if the second unit detects that the transmission via the first communications method was not successfully executed.

17. The computer implemented system of claim 15, wherein the customer's response constitutes performing a single action by the customer.

18. The computer implemented system of claim 17, wherein the single action comprises one of the following: pressing a button, touching a portion of a screen, or speaking a sound.

19. The computer implemented system of claim 15, wherein the second unit verifies the identify of the customer prior to implementing the list comprising at least one recommended rebalancing transaction.

20. The computer implemented system of claim 15, wherein, to implement the list comprising the plurality of recommended rebalancing transactions, the second unit generates execution instructions based on the list comprising the plurality of recommended rebalancing transactions; and transmits the execution instructions to an electronic trading system, whereby each transaction of the list comprising the plurality of recommended rebalancing transactions is executed electronically.

21. The computer implemented system of claim 15, wherein the second unit receives, as the customer's response, a return e-mail from the customer, wherein the return e-mail includes a transaction number identifying the list comprising the plurality of recommended rebalancing transactions.

22. The computer implemented system of claim 15, wherein the second unit receives, as the customer's response, an optical code for retrieving the list comprising the plurality of recommended rebalancing transactions, and verification information for verifying the identity of the customer.

23. The computer implemented system of claim 15, wherein the second unit receives, as the customer's response, voice sounds which are recognized using a voice recognition device.

24. The computer implemented system of claim 15, wherein the second unit receives the customer's response through a wireless communications network.

25. The computer implemented system of claim 15, wherein the second unit receives the customer's response from a financial kiosk.

26. The computer implemented system of claim 15, wherein the second unit receives the customer's response which is transmitted from a computer of the customer using a financial program installed on the computer.

* * * * *